(12) United States Patent
Shankar (10) Patent No.: US 7,523,276 B1
(45) Date of Patent: Apr. 21, 2009

(54) SYNCHRONIZATION OF SELECTED DATA FROM SNAPSHOTS STORED ON DIFFERENT STORAGE VOLUMES

(75) Inventor: Vinod R. Shankar, Redmond, WA (US)

(73) Assignee: Veritas Software Corporation, Mountain View, CA (US)

( * ) Notice: Subject to any disclaimer, the term of this patent is extended or adjusted under 35 U.S.C. 154(b) by 148 days.

(21) Appl. No.: 10/610,120

(22) Filed: Jun. 30, 2003

(51) Int. Cl.
*G06F 12/16* (2006.01)
(52) U.S. Cl. ...................... 711/162; 707/204
(58) Field of Classification Search ................ 711/162; 707/204
See application file for complete search history.

(56) References Cited

U.S. PATENT DOCUMENTS

| 5,907,672 | A  | * | 5/1999  | Matze et al.      | 714/8   |
| 6,366,987 | B1 | * | 4/2002  | Tzelnic et al.    | 711/162 |
| 6,941,420 | B2 | * | 9/2005  | Butterworth et al.| 711/114 |
| 2002/0059498 | A1 | * | 5/2002  | Ng et al.      | 711/112 |
| 2004/0181640 | A1 | * | 9/2004  | Factor et al.  | 711/162 |
| 2004/0254964 | A1 | * | 12/2004 | Kodama et al.  | 707/204 |

FOREIGN PATENT DOCUMENTS

EP   0683457 A1 * 11/1995

* cited by examiner

*Primary Examiner*—Shane M Thomas
(74) *Attorney, Agent, or Firm*—Campbell Stephenson, LLP (57) ABSTRACT

A method, system, computer system, and computer program product are provided to quickly synchronize selected data, such as a single file, from two or more versions of the data stored on different storage volumes. Selected data are synchronized with a snapshot of the data stored on a different storage volume without copying all of the data and without copying the entire set of selected data. The present invention has minimal impact on performance of applications using the data having one or more snapshots. Other data stored on the storage volumes (not part of the selected data) remain available for use and retain changes made prior to the synchronization.

16 Claims, 7 Drawing Sheets

FIG. 5A
Restore File 1 On Primary P To State At Time Of Snapshots

FIG. 5C Update File 1 In Updated Snapshot From Primary After File Re-Location

SYNCHRONIZATION OF SELECTED DATA FROM SNAPSHOTS STORED ON DIFFERENT STORAGE VOLUMES

Portions of this patent application contain materials that are subject to copyright protection. The copyright owner has no objection to the facsimile reproduction by anyone of the patent document, or the patent disclosure, as it appears in the Patent and Trademark Office file or records, but otherwise reserves all copyright rights whatsoever.

BACKGROUND OF THE INVENTION

1. Field of the Invention

The present invention relates to quickly synchronizing selected data, such as a single file, from two or more versions of the data stored on different storage volumes.

2. Description of the Related Art

Information drives business. A disaster affecting a data center can cause days or even weeks of unplanned downtime and data loss that could threaten an organization's productivity. For businesses that increasingly depend on data and information for their day-to-day operations, this unplanned downtime can also hurt their reputations and bottom lines. Businesses are becoming increasingly aware of these costs and are taking measures to plan for and recover from disasters.

Often these measures include protecting primary, or production, data, which is 'live' data used for operation of the business. Copies of primary data on different physical storage devices, and often at remote locations, are made to ensure that a version of the primary data is consistently and continuously available. Typical uses of copies of primary data include backup, Decision Support Systems (DSS) data extraction and reports, testing, and trial failover (i.e., testing failure of hardware or software and resuming operations of the hardware or software on a second set of hardware or software). These copies of data are preferably updated as often as possible so that the copies can be used in the event that primary data are corrupted, lost, or otherwise need to be restored.

Two areas of concern when a hardware or software failure occurs, as well as during the subsequent recovery, are preventing data loss and maintaining data consistency between primary and backup data storage areas. One simple strategy includes backing up data onto a storage medium such as a tape, with copies stored in an offsite vault. Duplicate copies of backup tapes may be stored onsite and offsite. However, recovering data from backup tapes requires sequentially reading the tapes. Recovering large amounts of data can take weeks or even months, which can be unacceptable in today's 24×7 business environment.

Figure 1A:
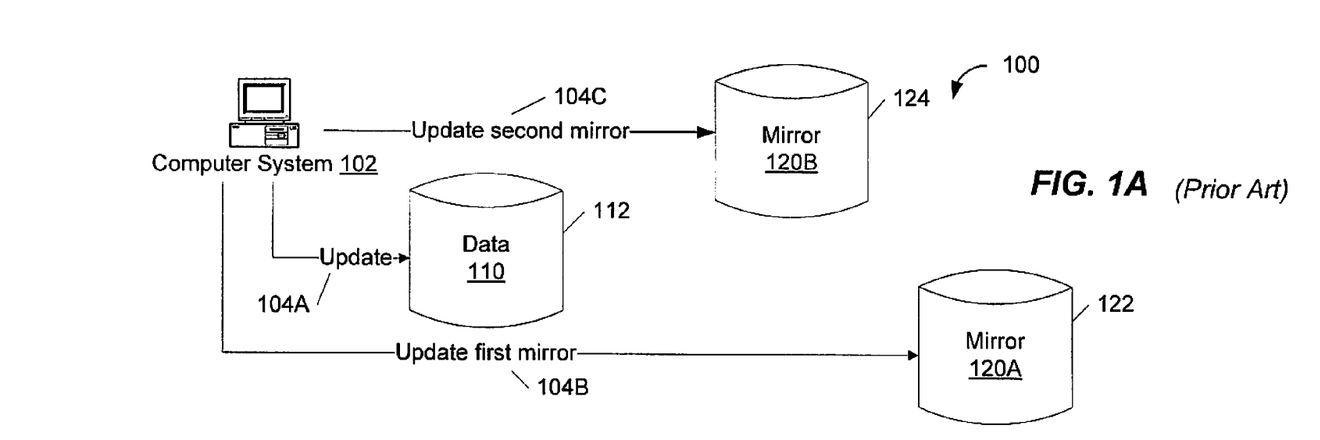
FIGS. 1A and 1B provide an example of a storage environment in which data mirroring is used, as described above.

More robust, but more complex, solutions include mirroring data from a primary data storage area to a backup, or "mirror," storage area in real-time as updates are made to the primary data. FIG. 1A provides an example of a storage environment 100 in which data 110 are mirrored. Computer system 102 processes instructions or transactions to perform updates, such as update 104A, to data 110 residing on data storage area 112.

A data storage area may take form as one or more physical devices, such as one or more dynamic or static random access storage devices, one or more magnetic or optical data storage disks, or one or more other types of storage devices. With respect to backup copies of primary data, preferably the storage devices of a volume are direct access storage devices such as disks rather than sequential access storage devices such as tapes.

In FIG. 1A, two mirrors of data 110 are maintained, and corresponding updates are made to mirrors 120A and 120B when an update, such as update 104A, is made to data 110. For example, update 104B is made to mirror 120A residing on mirror data storage area 122, and corresponding update 104C is made to mirror 120B residing on mirror data storage area 124 when update 104A is made to data 110. Each mirror should reside on a separate physical storage device from the data for which the mirror serves as a backup, and therefore, data storage areas 112, 122, and 124 correspond to three physical storage devices in this example.

Figure 1B:
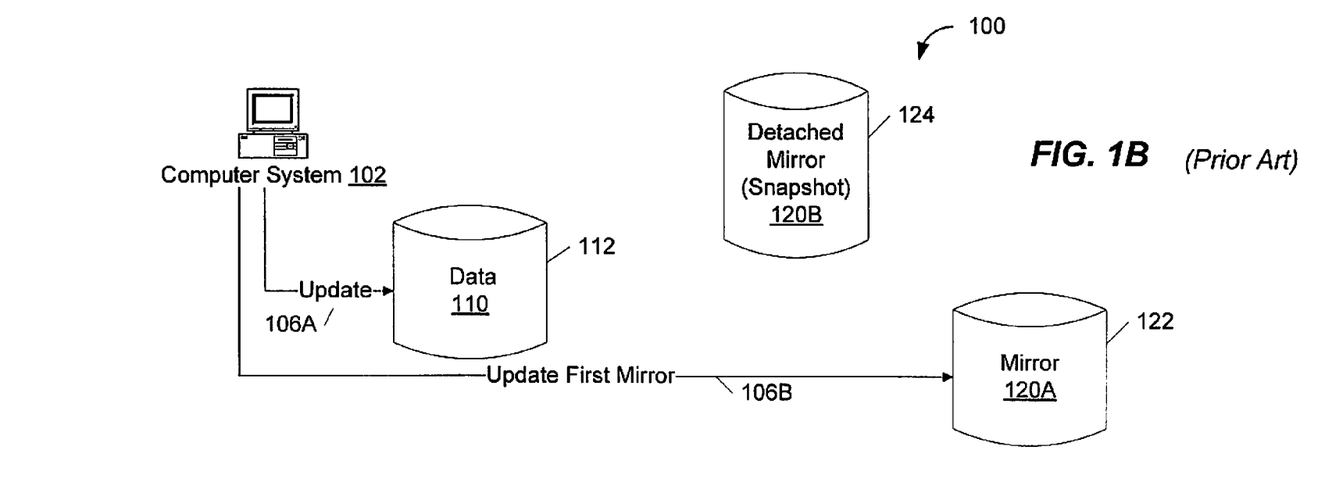

A snapshot of data can be made by "detaching" a mirror of the data so that the mirror is no longer being updated. FIG. 11B shows storage environment 100 after detaching mirror 120B. Detached mirror 120B serves as a snapshot of data 110 as it appeared at the point in time that mirror 120B was detached. When another update 106A is made to data 110, a corresponding update 106B is made to mirror 120A. However, no update is made to detached mirror 120B.

Saving backup copies or snapshots on mirrored direct access storage devices, rather than on sequential access storage devices, helps to speed synchronization of a snapshot with the data from which the snapshot was made. However, copying all data from snapshots can be unacceptably time-consuming when dealing with very large volumes of data, such as terabytes of data. Copying only individual files is possible using file copying utilities such as xcopy, but these utilities do not operate on selected portions of a file. For example, if only one bit has changed in a file containing one gigabyte of data, then a file copy utility must copy the entire gigabyte of data to capture the change, which is also very time consuming. A faster way to restore and/or synchronize selected data from large volumes of data and/or files is needed.

One solution to the problem of restoring data from a snapshot is to save the changes made to the data after the snapshot was taken. Those changes can then be applied in either direction. For example, the changes can be applied to the snapshot when there is a need for the snapshot to reflect the current state of the data. For example, referring back to FIG. 1B, after update 106A is made to data 110, detached mirror (snapshot) 120B is no longer "synchronized" with data 110. To be synchronized with data 110, detached mirror (snapshot) 120B can be updated by applying the change made in update 106A.

Alternatively, to return to a previous state of the data before update 106A was made, the changed portion of data 110 can be restored from (copied from) detached mirror (snapshot) 120B. The change made in update 106A is thereby "backed out" without copying all of the data from the snapshot.

Saving the actual changes made to very large volumes of data can be problematic, however, introducing additional storage requirements. To save physical disk space, changes can be stored in temporary data storage areas such as volatile memory, but those changes are vulnerable to computer system, hardware, and software failures. In addition, storing the changes in temporary data storage areas typically requires that the snapshot and the data are stored in a common physical storage area that can be accessed by a common volatile memory. A requirement that the snapshot and the data be stored in a common physical data storage area can limit the number of snapshots that can be made of the data in organizations having limited resources or a very large amount of data.

Without storing all of the actual changes to data, one solution is to keep track of regions in each storage area that have changed with respect to regions of another storage area storing a copy of the data. One way to keep track of changed regions is to use bitmaps, also referred to herein as data change maps or maps, with the storage areas (volumes) divided into regions and each bit in the bitmap corresponding to a particular region of the storage area (volume). Each bit is set to logical 1 (one) if a change to the data in the respective region has been made with respect to a snapshot of the data. If the data have not changed since the snapshot was made, the respective bit is set to logical 0 (zero).

Figure 2:
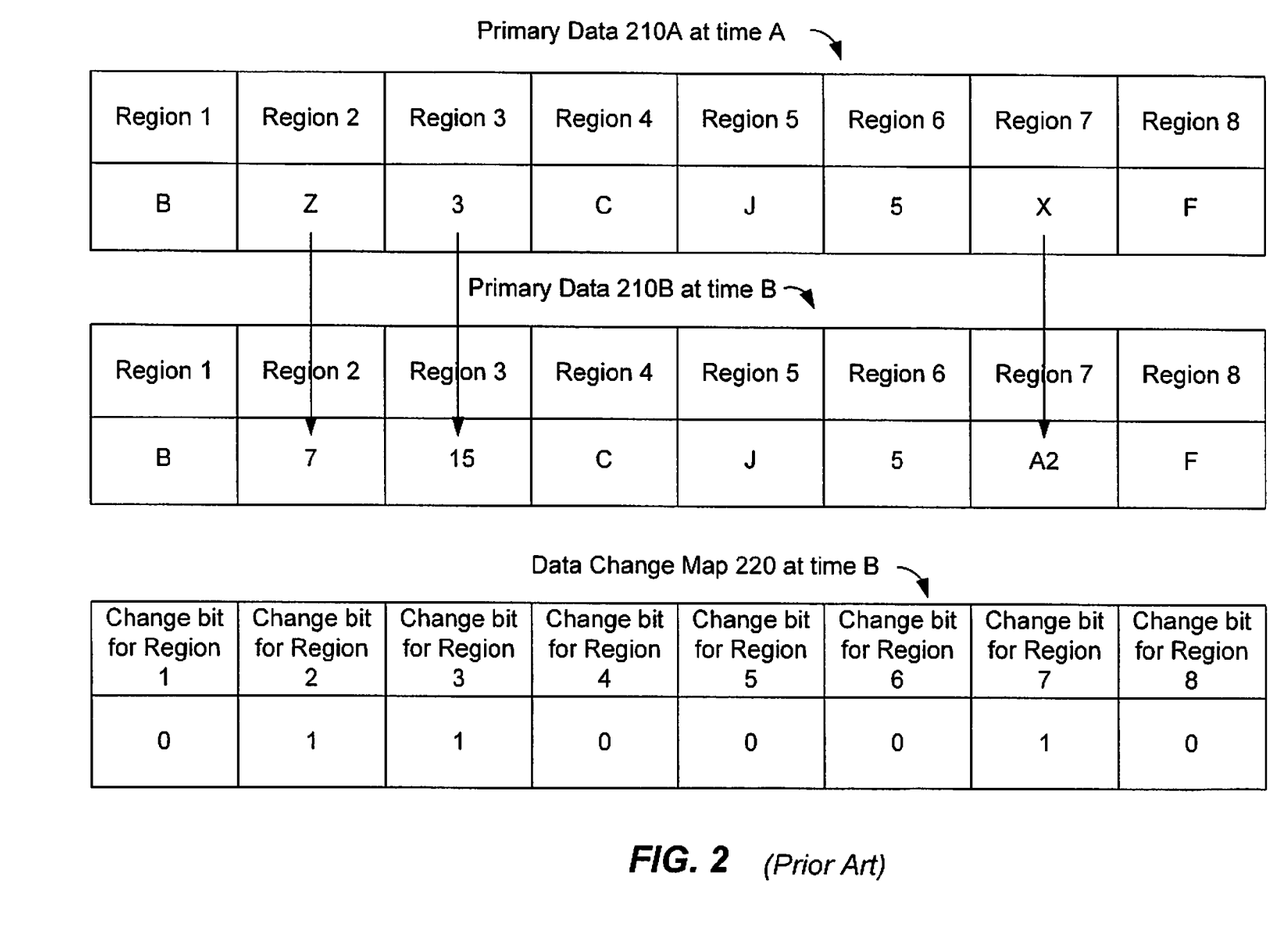
FIG. 2 shows primary data and a data change map for tracking changes to the primary data, as described above.

FIG. 2 shows an example of primary data at two points in time, where primary data 210A represents the primary data as it appeared at time A and primary data 210B represents the primary data as it appeared at time B (time B being later than time A). Also shown is a corresponding data change map 220 at time B showing eight regions of the primary data for explanation purposes. As shown in data change map 220, the primary data in regions 2, 3, and 7 changed between times A and B. Assume that a snapshot of the data is taken at time A. If the primary data are later corrupted, then the primary data can be restored back to the state of the data at the time the snapshot was taken. This restoration can be accomplished by copying regions 2, 3, and 7 (identified as the regions having a value of 1 in the data change map) from the snapshot to the primary data. Alternatively, to bring the snapshot up to date, regions 2, 3, and 7 can be copied from the primary data 210B at time B to the snapshot. This solution enables the two copies of the data to be synchronized without copying all data (such as all data in a very large file) from one set of data to the other.

However, this form of data change tracking operates upon regions of the storage volume rather than on logical organizations of the data, such as a selected file. All changed regions of the storage volumes are synchronized using the data change map described above. Because portions of a selected file may be scattered among multiple regions on the storage volume, the data change tracking solution does not provide for selectively synchronizing changed portions of a logical set of data, such as changed portions of a single file, on different volumes.

Such a limitation becomes problematic when very large files are involved. For example, assume that only one of a set of twenty large files on the volume is corrupted. Using the data change map described above, all changed regions containing portions of any of the twenty large files are synchronized. Furthermore, changes made to files that were not corrupted are "backed out" unnecessarily, and those files are unavailable for use during synchronization. For example, if the files contain databases, all databases stored in the changed regions of the volume would be unavailable during the time required to synchronize the data. These databases would have to be taken offline, brought back online, and logs of transactions occurring during the time the databases were offline would need to be applied to each database. Additional processing of files that are not corrupted greatly slows the synchronization process and wastes resources.

What is needed is the ability to synchronize only selected data, such as changed portions of a single file or other logical set of data, from two or more versions of the data stored in different storage areas. Preferably, the solution should enable the selected data to be synchronized with a snapshot of the data stored in different storage areas without copying all of the data. The solution should have minimal impact on performance of applications using the data having one or more snapshots. The solution should enable other data stored in the storage areas to remain available for use and to retain changes made if the other data are not part of the selected data being synchronized.

SUMMARY OF THE INVENTION

The present invention includes a method, system, computer program product, and computer system that quickly synchronize selected data from different versions of the data stored in different storage areas. Selected data are synchronized with a snapshot of the data stored in a different storage area without copying all of the data. The present invention has minimal impact on performance of applications using the data having one or more snapshots. Other data stored in the storage areas (not part of the selected data) remain available for use and retain changes made prior to the synchronization.

BRIEF DESCRIPTION OF THE DRAWINGS

The present invention may be better understood, and its numerous objectives, features and advantages made apparent to those skilled in the art by referencing the accompanying drawings.

The use of the same reference symbols in different drawings indicates similar or identical items.

DETAILED DESCRIPTION

For a thorough understanding of the subject invention, refer to the following Detailed Description, including the appended Claims, in connection with the above-described Drawings. Although the present invention is described in connection with several embodiments, the invention is not intended to be limited to the specific forms set forth herein. On the contrary, it is intended to cover such alternatives, modifications, and equivalents as can be reasonably included within the scope of the invention as defined by the appended Claims.

In the following description, for purposes of explanation, numerous specific details are set forth in order to provide a thorough understanding of the invention. It will be apparent, however, to one skilled in the art that the invention can be practiced without these specific details.

References in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Introduction

The present invention includes a method, system, computer program product, and computer system that quickly synchronize selected data from different versions of the data stored in different storage areas. Selected data are synchronized with a corresponding portion of a snapshot of the data stored in a different storage area without copying all of the data. The present invention has minimal impact on performance of applications using the data having one or more snapshots. Other data stored in the storage areas (not part of the selected data) remain available for use and retain changes made prior to the synchronization.

One of skill in the art will recognize that the unit of storage can vary according to the type of storage area, and may be specified in units of bytes, ranges of bytes, files, file clusters, or units for other types of storage objects. The term "storage volume" is used herein to refer generally to any type of storage area or object, and the term "regions" and/or blocks are used to describe the unit of storage on a storage volume. The use of the terms volume, region, and block herein is not intended to be limiting and is used herein to refer generally to any type of storage object.

Each block is typically of a fixed size; for example, a block size of 512 bytes is commonly used. Thus, a volume of 1000 Megabyte capacity contains 2,048,000 blocks of 512 bytes each. Any of these blocks can be read from or written to by specifying the block number (also called the block address). Typically, a block must be read or written as a whole. Blocks are grouped into regions; for example, a typical region size is 32K bytes. Note that blocks and regions are of fixed size, while files can be of variable size. Therefore, synchronizing data in a single file may involve copying data from multiple regions.

Each storage volume has its own respective data change map to track changes made to each region of the volume. Note that it is not a requirement that the data change map be implemented as a bitmap. The data change map may be implemented as a set of logical variables, as a table of indicators for regions, or using any means capable of tracking changes made to data in regions of the storage volume.

In many environments, snapshot volumes are not changed in order to preserve an image of the primary volume at the time the snapshot volume was made. Such unchanged snapshot volumes are sometimes referred to as static snapshot volumes, and the snapshot data is referred to as a static snapshot. It is possible that data may be accidentally written to a static snapshot volume, so that the respective data change map shows that regions of the snapshot volume have changed.

In other environments, it may be desirable to allow the snapshot to be independently updated after the snapshot is taken. For example, the primary and snapshot volumes may be managed by different nodes in a distributed system, and the same update transactions may be applied to both volumes. If the node managing data on one of the volumes fails, the other volume can be used to synchronize the failed volume to a current state of the data. Independently updated snapshots are supported by maintaining a separate bitmap for the snapshot volume.

Figure 3:
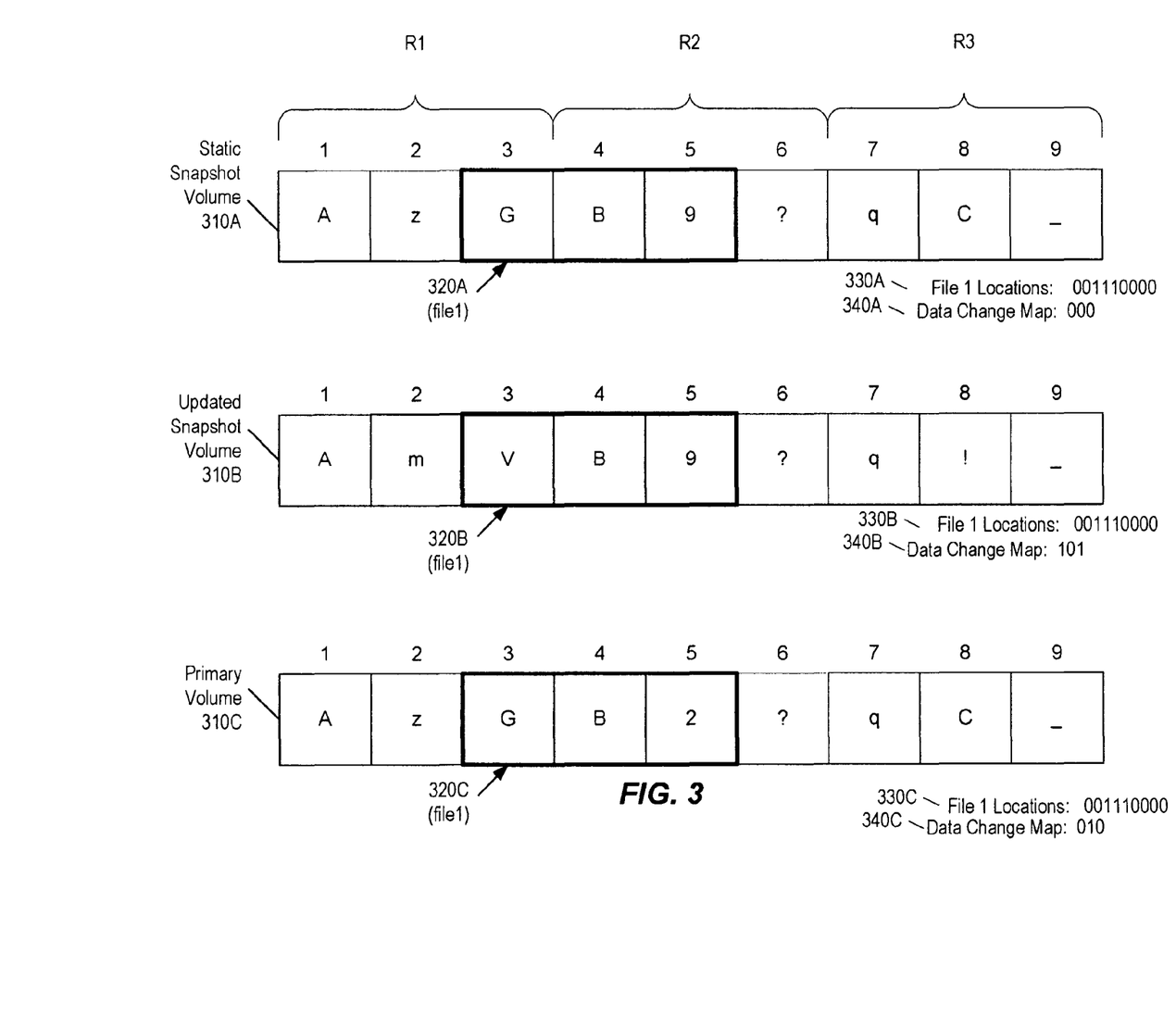
FIG. 3 shows example data for a primary volume, static snapshot of the primary volume, and updated snapshot of the primary volume.

FIG. 3 shows example data stored in a primary volume 310C, a static snapshot volume 310A of the primary volume 310C made at an earlier point in time, and an updated snapshot volume 310B of the primary volume 310C, made at the same point in time as static snapshot volume 310A. Each volume includes a first, second, and third region, respectively regions R1, R2, and R3, with each region divided into three locations. The locations are numbered sequentially 1-9 in each storage volume.

A file named file1 320C on primary volume 310C has been selected to be synchronized with a copy of file1 320A or 320B on either static snapshot volume 310A or updated snapshot volume 310B. File1 includes data in location 3 of region 1 and in locations 4 and 5 of region 2 on all three volumes, as shown by the file1 locations 330A, 330B and 330C having a value of "00111000" for all three volumes. A data change map 340A having a value of "000" indicates that no regions have changed on static snapshot volume 310A since the snapshot volumes were made. A data change map 340B having a value of "101" indicates that data in regions 1 and 3 have changed on updated snapshot volume 310B, and a data change map 340C having a value of "010" indicates that data in region 2 of primary volume 310C have changed since the snapshot volumes were made.

Figure 4:
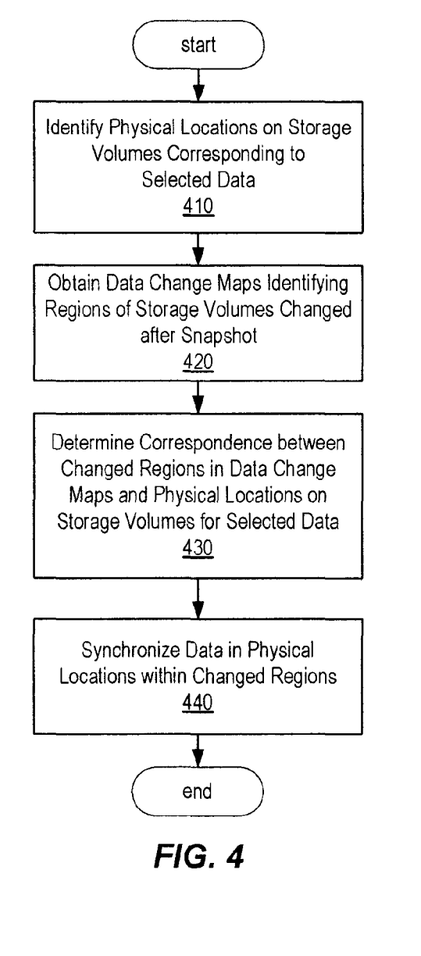
FIG. 4 is a flowchart of actions taken to synchronize selected data in accordance with the present invention.

FIG. 4 is a flowchart of actions taken to synchronize selected data in accordance with the present invention. In "Identify Physical Locations on Storage Volumes Corresponding to Selected Data" step 410, physical locations on the storage volumes are identified that contain portions of the selected data (e.g., file1). These physical locations are identified in FIG. 3 as file 1 locations 330A, 330B, and 330C, having a value of "00111000" for all three volumes, indicating that data for file 1 resides in locations 3, 4, and 5 on each volume. Physical locations for file1 are identified on all volumes, because the locations may be different on different storage volumes. For example, a storage volume may be reconfigured and files on the storage volumes moved to different locations on the reconfigured volume.

Identification of the physical locations for file1 can be made, for example, by querying the file system for file extents associated with the selected data file on a given storage volume. A file extent is provided by the file system, and the file extent includes a layout of physical locations for the file on the physical storage volume. The file extent typically includes an address for a starting location in the file and a size (the number of contiguous locations beginning at the address). A single file can include several non-contiguous portions (each of which will have a respective starting location and size). One of skill in the art will recognize that file extents can be expressed in storage units such as file clusters, but are referred to herein as locations on the volumes for simplicity purposes.

In "Obtain Data Change Maps Identifying Regions of Storage Volumes Changed after Snapshot" step 420, data change maps are obtained for both the primary volume and for the snapshot volume(s) of interest. For example, data change maps 340A, 340B, and 340C can be obtained. As explained above, data change map 340A having a value of "000" indicates that no regions have changed on static snapshot volume 310A since the snapshots were taken. Data change map 340B having a value of "101" indicates that data in regions 1 and 3 have changed on updated snapshot volume 310B, and data change map 340C having a value of "010" indicates that data in region 2 of primary volume 310C have changed.

In "Determine Correspondence between Changed Regions in Data Change Maps and Physical Locations on Storage Volumes for Selected Data" step 430, the changed regions on the storage volume as indicated in the data change maps are compared to the physical locations on the storage volume for the selected data. If regions have changed that include the physical locations of the selected data, the physical locations of the selected data within those regions should be synchronized. Examples of such synchronizations are described further with reference to FIG. 5 below.

Figure 5A:
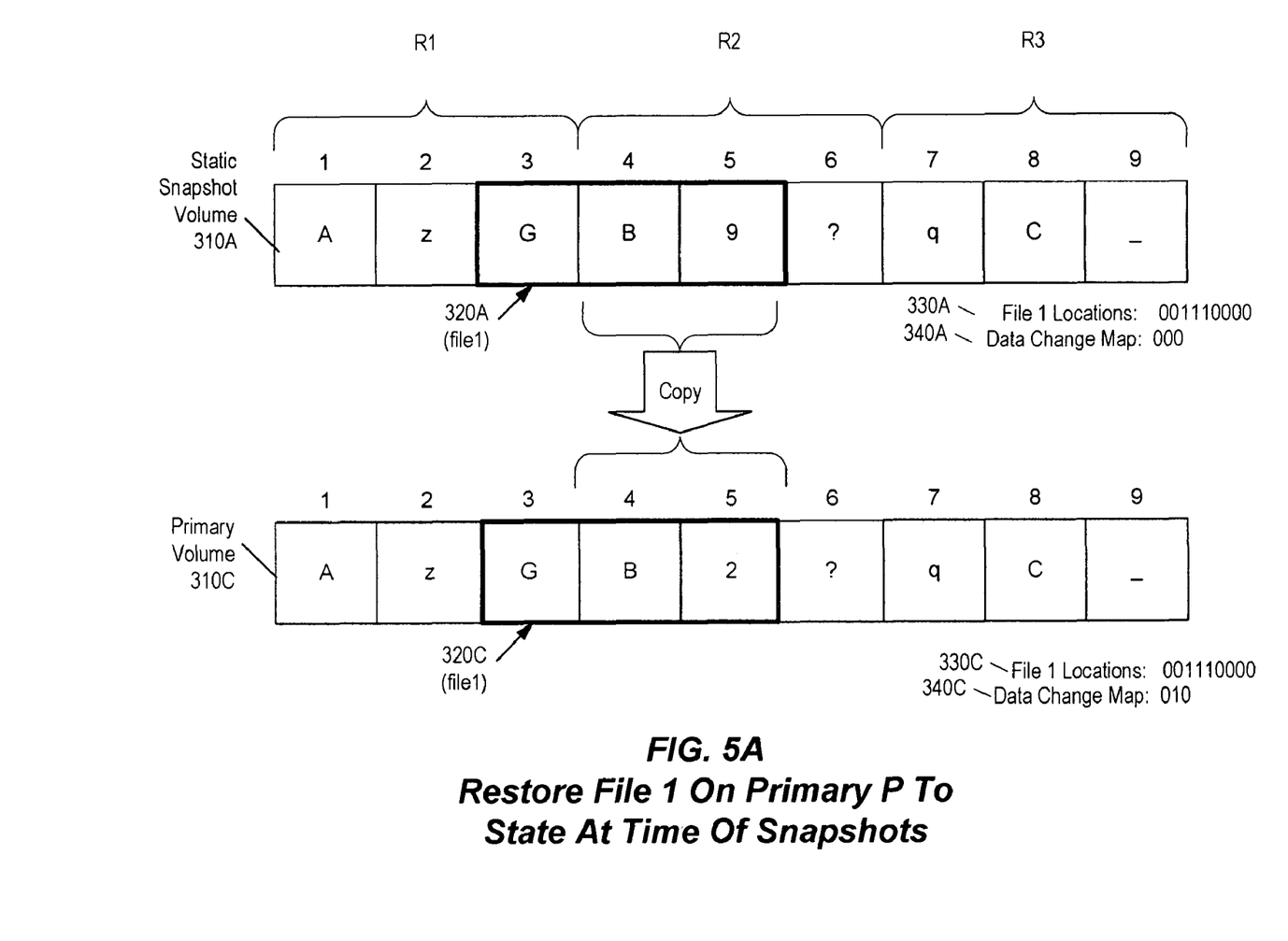
FIG. 5A shows an example of data copied to restore a file on the primary volume of FIG. 3 to a state of the file at the time the static snapshot was taken.
Figure 5B:
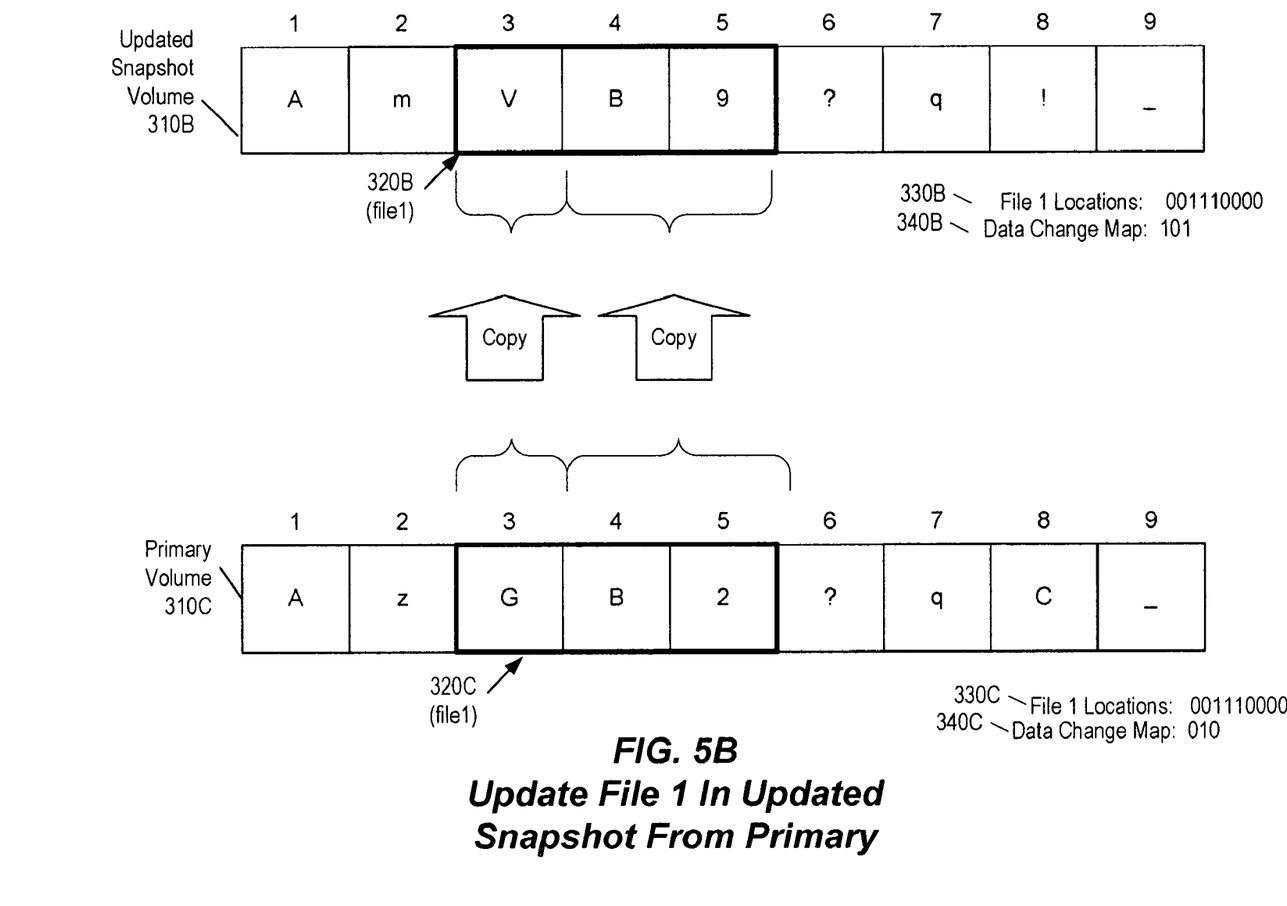
FIG. 5B shows an example of data copied to synchronize the file in the updated snapshot of FIG. 3 with the primary volume of FIG. 3.
Figure 5C:
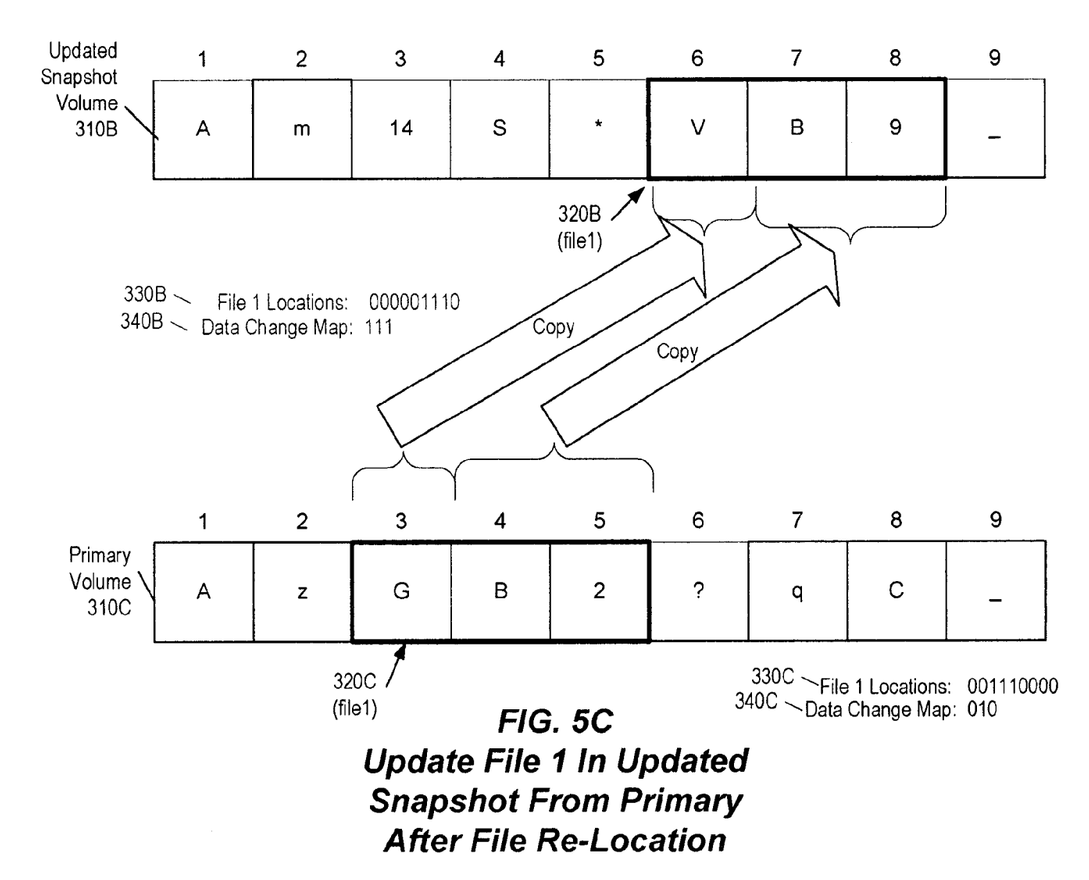
FIG. 5C shows an example of data copied to update a file with data from the primary volume of FIG. 3 after the file has been relocated within the updated snapshot of FIG. 3.

In "Synchronize Data in Physical Locations for Selected Data within Changed Regions" step 440, the data for file1 are synchronized between primary volume 310C and one of the snapshot volumes 310A or 310B. FIGS. 5A, 5B, and 5C, collectively referred to as FIG. 5, provide examples of different synchronization scenarios for the data volumes shown in FIG. 3.

FIG. 5A shows an example of data copied to restore file1 on the primary volume 310C to a state at the time the snapshot volumes 310A and 310B were made. As shown by file1 locations 330A and 330C, file1 320A and 320C data resides in locations 3 (part of region 1), 4 and 5 (both part of region 2) of both primary volume 310C and static snapshot volume 310A. The data change map 340C for primary volume 310C shows that data in region 2 have changed, and the data change map 340A for static snapshot volume 310A shows that no data have changed. Therefore, to synchronize file1 320A on static snapshot volume 310A and file1 320C on primary volume 310C, only data in region 2 corresponding to locations for file1 320A (locations 4 and 5) are copied to file1 320C on primary volume 310C to restore primary volume 310C to its state when the snapshot volumes were made. Although region 1 location 3 also contains a portion of file1, it is unnecessary to copy data from region 1 location 3 because no data in region 1 have changed.

FIG. 5B shows an example of data copied to synchronize file1 320B in updated snapshot volume 310B with file1 320C primary volume 310C. As shown by file1 locations 330B and 330C, file1 data resides in locations 3 (part of region 1), 4 and 5 (both part of region 2) of both primary volume 310C and updated snapshot volume 310B. Data in updated snapshot volume 310B regions 1 and 3 have changed since the snapshot volumes were made, as indicated by data change map 340B. Furthermore, data in region 2 of primary volume 310C region 2 have changed, as indicated by data change map 340C.

In a traditional synchronization of regions, regions 1, 2, and 3 are copied in their entirety from primary volume 310C to updated snapshot volume 310B. However, file1 locations 330B indicate that no locations for file1 320B reside in region 3. Furthermore, only location 3 of region 1 and locations 4 and 5 of region 2 are included in file1 320B and 320C. Therefore, only data in region 1 location 3 and region 2 locations 4 and 5 need to be copied to updated snapshot volume 310B to synchronize the file1 320B data with file1 320C data on primary volume 310C. By copying only the selected locations belonging to file, data in region 1 locations 1 and 2 and region 2 location 6 are unaffected and can remain available for use by other applications. Even though the value of location 4 is the same in both updated snapshot volume 310B and primary volume 310C, because location 4 is part of both file1 320C and a changed region, location 4 is copied.

FIG. 5C shows an example of data copied to update file1 320B in updated snapshot 310B from file1 320C of primary volume 310C after updated snapshot volume 310B is reconfigured and file1 320B has been relocated. Data change map 340B indicates that all three regions of updated snapshot volume 310B have changed due to the reconfiguration. File1 320B has been moved to locations 6 (region 2), 7 and 8 (both part of region 3) of updated snapshot volume 310B. While all three regions of updated snapshot volume 310B have changed, no data for file1 320B resides in region 1 of updated snapshot volume 310B. The contents of file1 320C on primary volume 310C locations (region 1), 4 and 5 (both in region 2) are copied to updated snapshot volume 310B locations 6 (region 2), 7 and 8 (both in region 3) to updated file 320B.

Assume that the size of file1 on primary volume 310C has grown from one gigabyte, as stored in file1 320A of static snapshot volume 310A, to 1.2 gigabytes. To restore file1 320C to its state at the time that the snapshot volumes were made, one embodiment of the present invention also includes resizing the file back to its original size. Using file system commands, file1 320C on primary volume 310C can be resized, for example, by truncating data, so that file1 320C can hold 1 gigabyte of data. When the data for file1 320A are copied from static snapshot volume 310A to primary volume 310C, file1 320C on primary volume 310C is an appropriate size to hold the original data.

The present invention can be applied to any logical set of data, including, for example, a mailbox for electronic mail, as long as physical locations on the storage volume for the logical set of data can be determined. These physical locations can be mapped to changed regions on the storage volume and only the changed portions of the logical set of data can be synchronized.

The invention operates by mapping physical locations for selected data to regions that have changed in the physical storage volume. Only data that are in both the physical locations for the selected data and the changed regions are synchronized. These data can be quickly identified and synchronized in much less time and with fewer resources required than with previous methods. Furthermore, only the selected data is affected by the synchronization. Other data on the storage volume remain available for use and are not changed by the synchronization.

OTHER EMBODIMENTS

The functionality described in FIG. 4 can be provided by many different software and hardware configurations. One of skill in the art will recognize that the functionality described for the replication and synchronization facilities herein may be performed by various modules, instructions, and/or other means of providing the functionality. For example, a single module may be used to determine the physical locations for the selected data in the storage volumes and identify changed regions of the storage volumes (for example, using the data change maps). The single module may also determine when the physical locations and the changed regions correspond. The single module may also synchronize data in locations for the selected data on the primary volume with data in corresponding locations for the selected data on the snapshot volume, in either direction.

Alternatively, a determining module may determine the physical locations for the selected data in the storage volumes, and a separate identifying module may identify changed regions of the storage volumes from the data change maps. Another determining module may determine when the physical locations and the changed regions correspond. A separate synchronizing module may also synchronize data in locations for the selected data on the primary volume with data in corresponding locations for the selected data on the snapshot volume, in either direction. Other configurations to perform the same functionality are within the scope of the invention.

The actions described with reference to FIG. 4 may be performed, for example, by a computer system that includes a memory and a processor configured to execute instructions, such as computer system 102 of FIG. 1; by an integrated circuit (e.g., an FPGA (Field Programmable Gate Array) or ASIC (Application-Specific Integrated Circuit) configured to perform these actions; or by a mechanical device configured to perform such functions.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

The foregoing described embodiments include components contained within other components, such as a storage volume containing both a data change map and data. It is to be understood that such architectures are merely examples, and that, in fact, many other architectures can be implemented which achieve the same functionality. In an abstract but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected," or "operably coupled," to each other to achieve the desired functionality.

The foregoing detailed description has set forth various embodiments of the present invention via the use of block diagrams, flowcharts, and examples. It will be understood by those within the art that each block diagram component, flowchart step, operation and/or component illustrated by the use of examples can be implemented, individually and/or collectively, by a wide range of hardware, software, firmware, or any combination thereof.

The present invention has been described in the context of fully functional computer systems; however, those skilled in the art will appreciate that the present invention is capable of being distributed as a program product in a variety of forms, and that the present invention applies equally regardless of the particular type of signal bearing media used to actually carry out the distribution. Examples of signal bearing media include recordable media such as floppy disks and CD-ROM, transmission type media such as digital and analog communications links, as well as media storage and distribution systems developed in the future.

The above-discussed embodiments may be implemented by software modules that perform certain tasks. The software modules discussed herein may include script, batch, or other executable files. The software modules may be stored on a machine-readable or computer-readable storage medium such as a disk drive. Storage devices used for storing software modules in accordance with an embodiment of the invention may be magnetic floppy disks, hard disks, or optical discs such as CD-ROMs or CD-Rs, for example. A storage device used for storing firmware or hardware modules in accordance with an embodiment of the invention may also include a semiconductor-based memory, which may be permanently, removably, or remotely coupled to a microprocessor/memory system. Thus, the modules may be stored within a computer system memory to configure the computer system to perform the functions of the module. Other new and various types of computer-readable storage media may be used to store the modules discussed herein.

The above description is intended to be illustrative of the invention and should not be taken to be limiting. Other embodiments within the scope of the present invention are possible. Those skilled in the art will readily implement the steps necessary to provide the structures and the methods disclosed herein, and will understand that the process parameters and sequence of steps are given by way of example only and can be varied to achieve the desired structure as well as modifications that are within the scope of the invention. Variations and modifications of the embodiments disclosed herein can be made based on the description set forth herein, without departing from the scope of the invention. Consequently, the invention is intended to be limited only by the scope of the appended claims, giving full cognizance to equivalents in all respects.

What is claimed is:

1. A method comprising:
    in response to selection of a selected file for synchronization:
        identifying a first physical location of the selected file in a first storage volume;
        identifying a second physical location of the selected file in a second storage volume, wherein the second storage volume stores a copy of the first storage volume;
        accessing a first change map, wherein the first change map identifies any regions of the first storage volume that have changed since the copy of the first storage volume was created;
        accessing a second change map, wherein the second change map identifies any regions of the second storage volume that have changed since the copy of the first storage volume was created; and
        synchronizing first data in the first physical location with second data in the second physical location, wherein the first data is stored in a first region of the first storage volume and the second data is stored in a second region of the second storage volume, and wherein the synchronizing is performed in response to at least one of: (a) the first change map identifying the first region and the first physical location including at least a portion of the first region, and (b) the second change map identifying the second region and the second physical location including at least a portion of the second region.

2. The method of claim 1 wherein the first physical location does not include a portion of the first region that stores third data, and wherein third data stored in the first region are not synchronized.

3. The method of claim 2 wherein
    the third data can be used during the synchronizing.

4. The method of claim 1 wherein
    the synchronizing the first data in the first physical location with the second data in the second physical location comprises copying the first data from the first physical location to the second physical location.

5. The method of claim 4 further comprising:
    adjusting a first size of a corresponding portion of the second data in the second physical location to match a second size of the first data prior to copying the first data from the first physical location to the second physical location.

6. The method of claim 1 wherein
    the synchronizing the first data in the first physical location with the second data in the second physical location comprises copying the second data from the second physical location to the first physical location.

7. The method of claim 6 further comprising:
adjusting a first size of the first data to match a second size of a corresponding portion of the second data in the second physical location prior to copying the second data from the second physical location to the first physical location.

8. A system comprising:
means for identifying a first physical location of a selected file in a first storage volume;
means for identifying a second physical location of the selected file in a second storage volume, wherein the second storage volume stores a copy of the first storage volume;
means for accessing a first change map, wherein the first change map identifies any regions of the first storage volume that have changed since the copy of the first storage volume was created;
means for accessing a second change map, wherein the second change map identifies any regions of the second storage volume that have changed since the copy of the first storage volume was created; and
means for synchronizing first data in the first physical location with second data in the second physical location, wherein the first data is stored in a first region of the first storage volume and the second data is stored in a second region of the second storage volume, and wherein the synchronizing is performed in response to at least one of: (a) the first change map identifying the first region and the first physical location including at least a portion of the first region, and (b) the second change map identifying the second region and the second physical location including at least a portion of the second region, and wherein the identifying the first physical location, the identifying the second physical location, the accessing the first change map, the accessing the second change map, and the synchronizing are performed in response to selection of the selected file for synchronization.

9. The system of claim 8 wherein the first physical location does not include a portion of the first region that stores third data, and wherein third data stored in the first region are not synchronized.

10. The system of claim 9 wherein
the third data stored in the first region can be used during the synchronizing.

11. A computer-readable storage medium comprising:
first instructions configured to identify a first physical location of a selected file in a first storage volume and to identify a second physical location of the selected file in a second storage volume, in response to selection of the selected file for synchronization, wherein the second storage volume stores a copy of the first storage volume;
second instructions configured to access a first change map and a second change map, in response to selection of the selected file for synchronization, wherein the first change map identifies any regions of the first storage volume that have changed since the copy of the first storage volume was created, and wherein the second change map identifies any regions of the second storage volume that have changed since the copy of the first storage volume was created; and
synchronizing instructions configured to synchronize first data in the first physical location with second data in the second physical location, wherein the first data is stored in a first region of the first storage volume and the second data is stored in a second region of the second storage volume, and wherein the synchronizing is performed in response to at least one of: (a) the first change map identifying the first region and the first physical location including at least a portion of the first region, and (b) the second change map identifying the second region and the second physical location including at least a portion of the second region.

12. The computer-readable storage medium of claim 11 wherein the first physical location does not include a portion of the first region that stores third data, and wherein third data stored in the first region are not synchronized by the synchronizing module.

13. The computer-readable storage medium of claim 12 wherein
the third data stored in the first region can be used when the synchronizing instructions synchronize the first data and the second data.

14. A computer system comprising:
a processor for executing instructions; and
a memory for storing instructions, wherein the instructions comprise:
instructions configured to identify a first physical location of a selected file in a first storage volume and to identify a second physical location of the selected file in a second storage volume, in response to selection of the selected file for synchronization, wherein the second storage volume stores a copy of the first storage volume;
instructions configured to access a first change map and a second change map, in response to selection of the selected file for synchronization, wherein the first change map identifies any regions of the first storage volume that have changed since the copy of the first storage volume was created, and wherein the second change map identifies any regions of the second storage volume that have changed since the copy of the first storage volume was created and
synchronizing instructions configured to synchronize first data in the first physical location with second data in the second physical location, wherein the first data is stored in a first region of the first storage volume and the second data is stored in a second region of the second storage volume, and wherein the synchronizing is performed in response to at least one of: (a) the first change map identifying the first region and the first physical location including at least a portion of the first region, and (b) the second change map identifying the second region and the second physical location including at least a portion of the second region.

15. The computer system of claim 14 wherein the first physical location does not include a portion of the first region that stores third data, and wherein third data stored in the first region are not synchronized by the synchronizing instructions.

16. The computer system of claim 15 wherein
the third data stored in the first region can be used when the synchronizing instructions synchronize the first data and the second data.

* * * * *